United States Patent [19]

Vargo

[11] Patent Number: 4,802,694
[45] Date of Patent: Feb. 7, 1989

[54] QUICK-DISCONNECT COUPLING
[75] Inventor: Edward E. Vargo, Enid, Okla.
[73] Assignee: Central Machine and Tool Co., Enid, Okla.
[21] Appl. No.: 112,253
[22] Filed: Oct. 26, 1987
[51] Int. Cl.⁴ ............................................. F16L 37/18
[52] U.S. Cl. ..................... 285/87; 285/312; 285/901; 285/924
[58] Field of Search .............. 285/312, 924, 87, 88, 285/82, 901

[56] References Cited
U.S. PATENT DOCUMENTS

| | | |
|---|---|---|
| 1,261,687 | 4/1918 | Brandon . |
| 1,646,873 | 10/1927 | Richards . |
| 2,033,142 | 3/1936 | Lewis . |
| 2,478,586 | 8/1949 | Krapp .................. 285/312 |
| 2,518,026 | 8/1950 | Krapp .................. 285/312 |
| 2,757,944 | 8/1956 | Krapp .................. 285/153 |
| 2,770,256 | 11/1956 | Krapp . |
| 2,770,474 | 11/1956 | Krapp . |
| 3,124,374 | 3/1964 | Krapp .................. 285/312 |
| 3,195,934 | 7/1965 | Parrish ................. 285/312 |
| 3,276,620 | 10/1966 | Dorfman ................. 220/85 |
| 3,314,698 | 4/1967 | Owens .................. 285/312 |
| 3,429,589 | 2/1969 | Parrish .................. 285/86 |
| 3,439,942 | 4/1969 | Moore et al. ........... 285/80 |
| 3,860,274 | 1/1975 | Ledstrom et al. ....... 285/312 |
| 3,976,313 | 8/1976 | Lauffenburger et al. ... 285/84 |
| 4,059,296 | 11/1977 | Panourgias ............ 285/312 |
| 4,295,670 | 10/1981 | Goodall et al. ......... 285/91 |
| 4,519,635 | 5/1985 | McMath ................ 285/93 |
| 4,647,075 | 3/1987 | Vargo .................. 285/82 |

OTHER PUBLICATIONS

Evertite Brochure, Ever-Tite Coupling Company, Inc., New York, N.Y., No. 101, Bleed-Off Coupler, 1 Sheet.

Primary Examiner—Thomas F. Callaghan
Attorney, Agent, or Firm—Laney, Dougherty, Hessin & Beavers

[57] ABSTRACT

A quick-disconnect coupling for connecting two sections of pipeline or other tubular conduit to each other, including a female coupler carrying a sleeve which is provided with at least one opening therethrough, and which has a locking handle mounted thereon for pivotation about a horizontal axis. The locking handle carries a camming head disposed at a location to project through the opening in the sleeve. The coupling further includes a tubular male adapter dimensioned for insertion into the sleeve and carrying an annular indented, concavely-surfaced groove. The concavely-surfaced groove is disposed on the male adapter at a location to afford alignment with the camming heads carried on the pivotally mounted locking handles. The sleeve also carries at the location of the openings therethrough, a spring-biased safety lever handle which also carries a camming head aligned with the annular groove in the male tubular member.

2 Claims, 2 Drawing Sheets

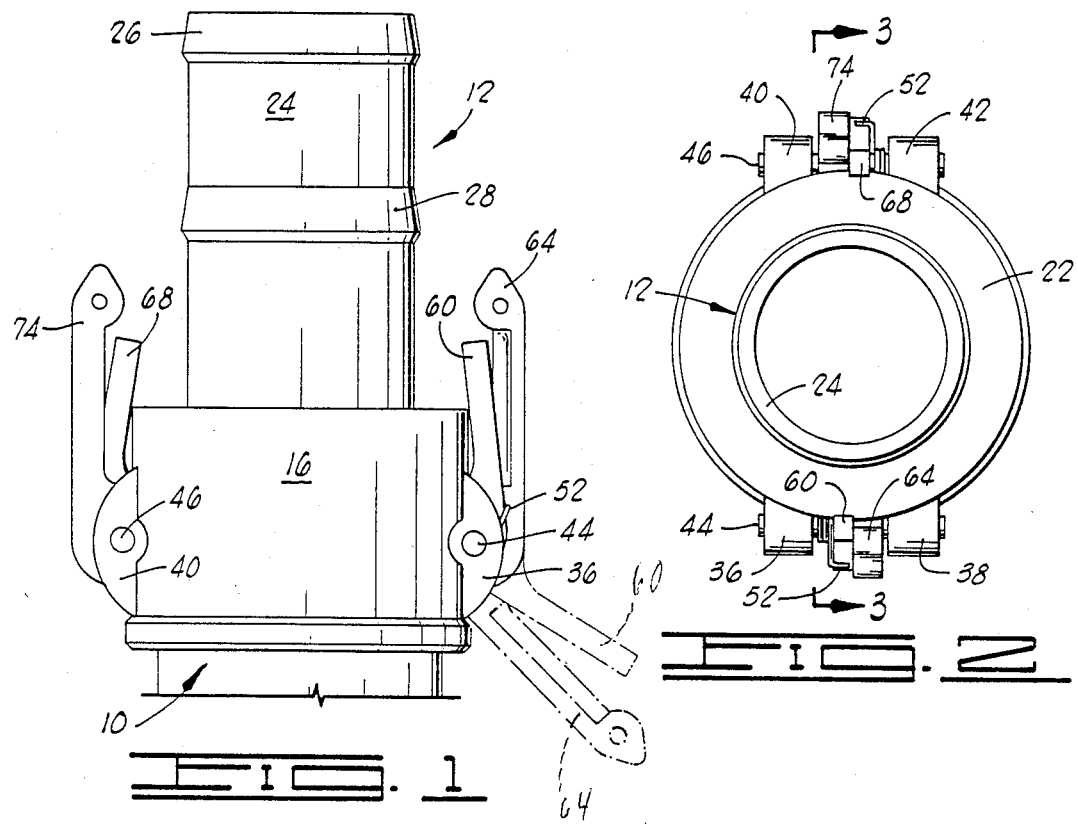
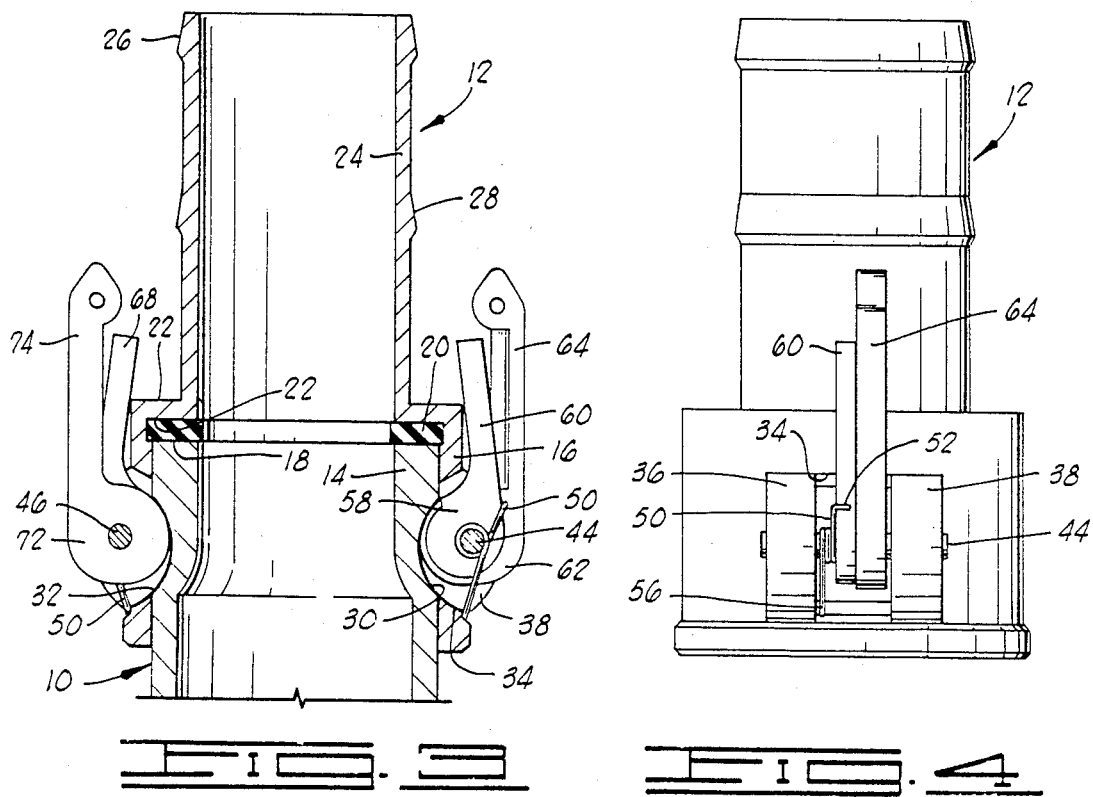

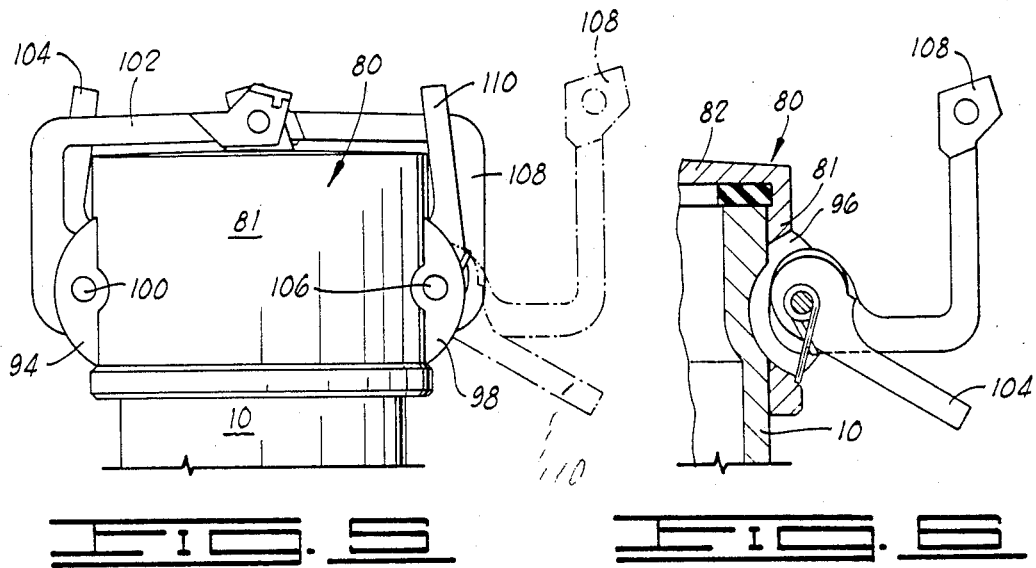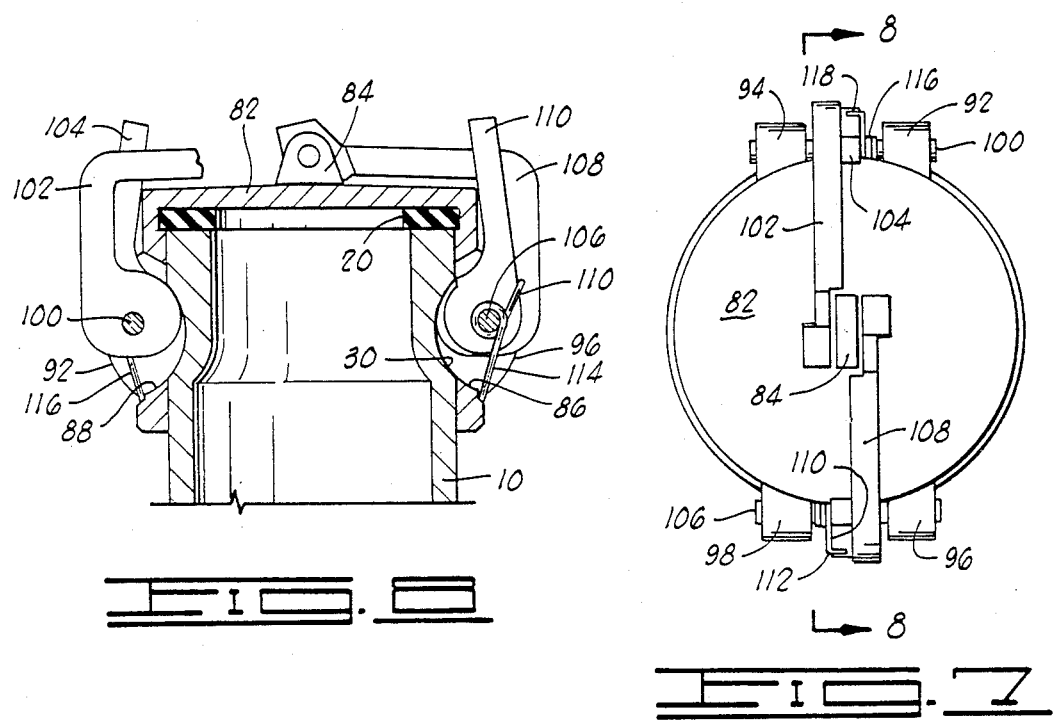

QUICK-DISCONNECT COUPLING

FIELD OF THE INVENTION

This invention relates to quick-disconnect couplings for use on hoses, tubings and the like to permit two sections thereof to be interconnected quickly through a fluid-type coupling suitable for use where the tubular elements carry a fluid under pressure, but which coupling can be quickly and safely released at such time as it is desired to de-couple the tubular elements connected to each other.

BACKGROUND OF THE INVENTION

Brief Description of the Prior Art

A number of types of quick connecting and disconnecting couplings for joinder of sections of tubular stock have been devised. Such couplings are used for quickly interconnecting ends of a pair of pipeline or conduit or hose sections for the purpose of establishing a fluid-tight coupling through which fluid may flow without leakage. An important desideratum in the design of such couplings is that the coupling be susceptible to manual release, preferably by one hand, and preferably almost instantaneously, so that where it is necessary to immediately interrupt the flow of fluid through the coupling to a remote location, such disconnection can be effected before a disaster or significant economic loss occurs as a result of continued flow of the fluid between the sections and through the coupling.

One type of quick-disconnect coupling which has previously been devised and patented, is that which is described and illustrated in Vargo U.S. Pat. No. 4,647,075, assigned to the assignee of the present application. The Vargo quick-disconnect coupling has a pair of opposed ports provided in the female socket body which has a projecting hose receiving neck. Pairs of spaced lugs are disposed on opposite sides of the two ports, and latching handles are mounted for pivotation in these lug pairs. The latching handles carry cam heads which have camming surfaces located radially inwardly of the female socket body in a position to cooperate with indentations formed in a male coupling element inserted in the female socket body when a pair of hose sections are connected to the coupling elements. A wire safety spring element is mounted adjacent the latching handles, and prevents the handles from prematurely unlatching the male coupling member as a result of vibratory forces.

Krapp U.S. Pat. No. 2,757,944 discloses a coupling which includes a set of cam handles which are cammed into a locked positioned by a pair of cams. When it is desired to bleed off the pressure, one of the handles is positioned as shown in the drawings of this patent so that the cam retains a part of its face in contact with the sealing gasket. The remainder of the face of the cam leaves the sealing gasket when the male member is tilted, thereby providing an opening for pressure to be relieved as shown by arrows in FIG. 3 of the drawings of this patent.

Owens U.S. Pat. No. 3,314,698 discloses a quick-disconnect coupling which includes a female part having a bore receiving a male adapter. The female part carries a cam arm which can be pivoted about a pivot pin so that a cam surface extends through an opening into a recess formed in the male adapter. A spring is provided to hold the cam arm in a locked position. This spring has convolutions wrapped around the hinge pin which passes through and pivotally supports the cam arm.

U.S. Pat. No. 4,519,635 to McMath describes a coupling which includes a set of handles pivotally mounted on the coupling and each including a first cam means and a second cam means. Each handle is provided with a cam surface which is defined by a plurality of cooperating cam surfaces. Such surfaces cooperate to provide a disconnecting movement until a particular position is reached, at which position the disconnection of the parts of the coupling is reversed, and becomes instead an incremental connecting movement occurring over a predetermined increment before allowing the members to be completely disconnected.

Moore U.S. Pat. No. 3,439,942 provides a conventional quick-release coupling made up of male and female coupling elements. It includes a relatively thin, flexible resilient retaining member which includes a planar first portion which is apertured to receive the pin upon which pivotally supports the lever arms used to latch the male and female elements to each other pivots. The retaining member has a second portion which is resilient, and is normally bent at an angle to the plane of the first portion so as to overlie and contact the lever arm and resiliently retain it in position.

Krapp U.S. Pat. No. 2,478,586 discloses a quick-disconnect coupling which includes a tubular insertable member having a seating face on one of its ends, and which insertable member is received within a socket member which includes a tubular portion having an internal shoulder. A gasket on this shoulder is adapted to be engaged by the seating face of the insertable member. A compound arm element having pairs of arms extending at an angle to each other is mounted on the socket member and includes a cam member extending into the socket member and adapted to be engaged and displaced by the end of the insertable member when the latter is inserted. A depression or groove is provided on the insertable member which is adapted to be engaged by the spring loaded pivoted handle on the socket member, and specifically the cam surface thereof, and forced thereby into seating engagement with the gasket.

Krapp U.S. Pat. No. 3,124,374 discloses and describes a self-venting, separable coupling which includes certain safety features which make the coupling particularly useful in connecting sections of a line used to carry a pressurized fluid. As explained in this patent, these types of couplings are in some cases dangerous, because when they are used in conjunction with such high pressure service lines because when they are de-coupled or disconnected through inadvertence at a time when the proper valves are not closed to prevent the continuation of high pressure fluid flow through the coupling. The coupling is then released explosively, and whips and thrashes about, endangering the workmen close by, as well as anyone else in the area.

This patentee recognizes that the prevention of accidents when using this type of coupling depends in large part on giving some type of warning that the coupling is carrying high pressure fluid, and it is equally or even more important that the coupling not be totally released so as to allow loss of fluid and injury to workmen or operators by reason of the thrashing sections of the de-coupled hose, and the high pressure fluid is ejected from the open ends thereof.

The safety lock coupling of Krapp as disclosed in U.S. Pat. No. 3,124,374 comprises male and female members, with the male member having a grooved portion designed to fit into the female member, and to receive in the groove, a locking and clamping means carried on the female member. The clamping means which is provided has a loose position, or release and a clamped position, and is composed of a pair of clamping handles pivoted on the female member, and having cam surfaces adapted to bear against the groove portion of the male member when in the clamped position. The cam surfaces of the clamping handles are so formed as to permit the cam surface to pivot clear of the grooved portion of the male adapter member when the clamping handles are moved to their loose or released positions.

There are further provided, a pair of locking levers which are also pivoted on the female member, and have cam surfaces which project into the groove formed on the male adapter at a time when the locking handles are pivoted to their locking position. The locking handles are designed so that when they are rotated into a release position, the cam surfaces which they carry are substantially withdrawn from the grooved portion of the male member.

In the use of this type of coupling, when the clamping levers are pivoted outwardly, this causes them to pivot on the female member, and to move into their loose or releasing position in which their radially inner cam surfaces are clear of the groove carried on the male member. At this time, however, the locking lever is still in its locking position with its cam surface projecting into the groove portion of the male member and fitting loosely therein. If there is pressure of a high magnitude in the line, it will at this time force the coupling slightly apart, and the loose fit of the locking cam surfaces will permit a slight release of the engagement of the coupling. The pressurized fluid will then leak out of the coupling in small quantities, apprising the operator that there is pressure in the line which needs to be relieved, or else that the high integrity coupling needs to be re-established by reclosing the clamping levers.

If there is no pressure in the line, the operator can fully release or disconnect the coupling by pivoting the locking levers outwardly into the release position so as to totally withdraw the cam surfaces from the groove in the male member. This allows the male member to be moved freely in an axial direction completely out of the female coupling. A detent member is urged by a spring into the path of movement of the locking handle so as to prevent the locking handle from being inadvertently pivoted outwardly to its total release position.

Other U.S. patents disclosing quick-disconnect couplings of the type having a male and female member sealingly interconnected by means of cam arms carried on the female member, with these arms acting through openings therein to engage the groove or recess in the male member are U.S. Pat. Nos. 2,518,026; 2,770,474 and 2,770,256 to Krapp.

Another quick detachable coupling for interconnecting sections of hose or tubing, and which can be quickly disconnected by means of pivoted latching handles carried on the female element is Parrish U.S. Pat. No. 3,195,934.

Another patent which recognizes the problem of adequate safety in a quick-disconnect cam locking coupling of the type involving a male element seated against a seal carried on an internal shoulder of a female coupling element is Goodall U.S. Pat. No. 4,294,670. The Goodall patent provides the usual external peripheral groove around the male element, and enables the male element to be sealingly joined to the female element by providing a pair of camming handles. Each of the camming handles includes a lever arm lying adjacent the female socket, and a cam portion which passes through a lateral or side opening provided in the female socket so as to engage the peripheral groove carried on the male element. Outward movement of the levers of the handles away from the female socket functions to disengage the cam portions from the peripheral groove carried on the male element. Each of the cam members is locked in the groove, however, by a removable wire pin which is engaged by at least one lug on the socket, and is positioned and adapted to limit the outward movement of the cam portion and thereby prevent total mechanical release of the male element from the female socket until the pressure has been bled down to an acceptable level. At this time, the wire pin is removed to allow disengagement of the principle parts of the coupling to then be completed in a safe manner.

Other pipe coupling devices of the general type described are depicted in U.S. Pat. Nos. 3,860,274 to Ledstrom et al, 2,033,142 to Lewis and 3,976,313 to Lauffenburger.

As indicated in some of the foregoing patents in some types of high pressure fluid service, where quick-disconnect couplings are employed, it is desirable to provide a coupling which does not completely mechanically disconnect the tubular sections from each other prior to the time that the pressure of the fluid conveyed through the coupled sections has been bled down or relieved to a sufficiently low level. This avoids the disconnected sections of the coupling and tubing from being forced violently away from each other at the time the coupling is completely disconnected mechanically. Moreover, the sudden escape of high pressure fluid at the instant that the coupling is totally disconnected mechanically can cause dangers of explosion or injury to personnel near the coupling at that time.

At least one type of coupling has been devised which provides for a gradual bleed down or relief of the pressure within the coupling before the coupling is totally mechanically disconnected, and which provides for a controlled release of the pressure at that time.

This coupling is a safety coupling and is referred to in the literature promulgated by the manufacturer, the Ever-Tite Coupling Company, Inc. of New York, New York, as a bleed-off coupler. A male adapter is inserted in a female coupler where the two are connected to the ends of sections of a tubing or conduit intended for high pressure service. The female coupler makes a fluid-tight connection with the male adapter when two pairs of handles which are provided are pivoted to a closing position with a single closing motion. In such instance, two different sets of locking cams are used on the two sets of handles. The function of the two handles is that when the coupling is to be disconnected, only one pair of the handles, called the locking handles, is initially pivoted outwardly, and this has the effect of partially opening the coupling so that it is in a pressure bleed down status. The fact that the fluid carried through the coupling is under high pressure is immediately recognized by the operator, and the coupling can then either be quickly re-closed by pivoting the locking handles to the locking position, or the coupling can be left in the bleed-off position until the high pressure of the fluid that is carried in the conduits is relieved. After this occurs, the coupling can then be safely and completely disconnected mechanically by pivoting the safety handles included in the second set of handles downwardly to a total release position.

BRIEF DESCRIPTION OF THE PRESENT INVENTION

The present invention provides a quick-disconnect or release coupling for coupling a pair of tubular fluid-conveyance elements, such as sections of pipeline or sections of hose or flexible conduit or the like, in end-to-end relation to each other, so that a quick release of the interconnection afforded by the coupling can be realized. The coupling of the invention is relatively simple in its mechanical elements and construction, but is reliable in its operation, and functions to establish a fluid-tight connection between tubing sections. The coupling can be quickly and easily manually released to a partially disconnected state. High pressure fluid can then be relatively slow bled through an opening provided through the partially disconnected coupling so as to relieve the pressure to a safe level allowing the coupling to then be totally disconnected.

Broadly described, the quick-disconnect coupling of the invention includes a male adapter having an end face and provided with an annular groove of arcuate, concave cross-sectional configuration extending around the adapter at a location near the end face. The coupling further includes a female coupler which includes a neck portion near one end of the coupler, and a receiving sleeve at the other end of the coupler. A pair of apertures or openings are disposed at circumferentially spaced intervals around the periphery of the sleeve, and extend through the sleeve. The sleeve is joined to the neck portion of the female coupler so as to provide a radially extending shoulder at the location where the neck portion, joins the sleeve. When the male adapter is inserted into the sleeve of the female coupler, the end face is adjacent the shoulder and an annular sealing element which is carried thereon. The annular groove which extends around the male adapter adjacent the end face thereof is then in radial alignment with the openings through the sleeve.

Disposed in a straddling position with respect to each of the openings formed radially through the sleeve of the female coupler are a pair of protuberant arcuate lugs. Each pair of lugs receives an end portion of a pivot pin, and each pivot pin journals a locking cam lever handle and a safety cam handle for pivotation about a common pivotal axis within the respective pivot pin. Thus, there are a pair of handles, i.e. a locking cam lever handle and a safety cam handle on each of the opposite sides of the female coupler. Each locking cam lever handle and each safety cam handle carries a cam head portion at one end thereof through which the respective pivot pin is passed, and each cam head portion functions to move a cam surface on the radially inner side thereof into the annular groove formed around the male adapter when the respective handles is pivoted to a coupling position. Pivotation of the locking handles to a locking position biases the male adapter so that its end face is in sealing contact with an annular seal carried against the shoulder formed within the sleeve of the female coupler.

Each safety cam handle is provided with a spring which is wrapped in convolutions around the respective pivot pin, and has one toe portion bearing against the safety cam handle. Each locking cam lever handle, on the other hand, has no spring, and when it is pivoted to a release position, it partially releases the male adapter from the female coupler so that a high pressure fluid passing through the coupling may bleed slowly from the partially cracked or released coupling until the pressure has been reduced to a safe level.

An important object of the present invention is to provide a quick release coupling which has relatively few moving parts, and which can be employed quite safely in high pressure fluid service for coupling the ends of a pair of conduit sections to each other.

Another object of the invention is to provide a safety coupling for high pressure fluid service which can be quickly manually disconnected to release tubular sections having the coupling parts attached to the ends thereof at a time when the coupling is no longer needed, and the service is to be discontinued.

Additional objects and advantages will become apparent from the following detailed description of the invention when the same is read in conjunction with the accompanying drawings which illustrate preferred embodiments of the invention.

GENERAL DESCRIPTION OF THE DRAWINGS

FIG. 1 is a side elevation view of a quick-disconnect coupling constructed in accordance with the present invention, and illustrating, in dashed lines, an alternate operating position of a locking handle and a spring biased safety lever handle which form parts of the invention.

FIG. 2 is an end elevation view of the quick-disconnect coupling shown in FIG. 1.

FIG. 3 is a sectional view taken along line 3—3 of FIG. 2.

FIG. 4 is a side elevational view of the quick-disconnect coupling depicted in FIG. 1, but showing the coupling as it appears after it has been rotated through 90° from the positioned depicted in FIG. 1.

FIG. 5 is a side elevation view of an alternate embodiment of the quick-disconnect coupling of the invention.

FIG. 6 is a detailed structural view showing certain details of structure which characterize the quick-disconnect coupling of the invention, and in particular, the locking handle and the spring biased safety lever handle which form parts of the coupling structure.

FIG. 7 is an end elevation view of the embodiment of the invention depicted in FIG. 5.

FIG. 8 is a cross-sectional view taken along line 8—8 of FIG. 7.

DETAILED DESCRIPTION OF A PREFERRED EMBODIMENT OF THE INVENTION

Referring initially to FIGS. 1–3 of the drawings, a male adapter is designated by reference numeral 10 and is shown connected to a female coupler, designated generally by reference numeral 12. The male adapter 10 includes an end portion 14 which extends into, and is surrounded by, a cylindrical terminal sleeve 16 carried on the end of the female coupler 12. As illustrated in FIG. 3, in the coupled status of the coupling the end face 18 of the male adapter presses against an annular resilient sealing element 20. The sealing element 20 bears against an annular, radially outwardly extending shoulder 22 formed at the junction between the cylindrical sleeve 16 and an extended neck portion 24 of the female coupler 12. The neck portion 24 is surrounded externally by a pair of axially spaced, annular ribs 26 and 28 which function to frictionally retain around the neck portion, the end of a tubular element or hose (not shown).

The male adapter 10 is characterized in having an annular indented concavity or groove 30 formed around the outer periphery of the adapter. The concave outwardly facing surface of the annular groove 30 acts as a camming surface in the operation of the coupling in the manner hereinafter described.

The sleeve 16 of the female coupler 12 is provided with a pair of openings 32 and 34 therethrough, which openings are spaced 180° apart around the sleeve and are axially aligned with the annular groove 30 on the male adapter 10 as best illustrated in FIG. 3. Secured to the sleeve 16 on circumferentially opposite sides of each of the openings 32 and 34 are a pair of arcuate, protuberant lugs. One pair of these lugs is denominated by reference numerals 36 and 38 and the other pair by reference numerals 40 and 42 (see FIG. 2). The lug pairs 36 and 38, which are positioned in axial alignment with the openings 32 and 34 disposed therebetween, function as journal or bearing supporting elements for receiving the opposite ends of a pair of pivot pins 44 and 46. The pivot pins 44 and 46 each function to support certain locking handles in a manner hereinafter described.

Referrring to FIG. 3, it will be perceived that the pivot pin 44 has its ends projected through the lugs 36 and 38 and has wrapped thereabout, several convolutions of a spring element 50. The spring element 50 has a toe 52 at one end thereof, and at the other end thereof, a leg 56 projects away from the convolutions of the spring and bears against the outer surface of the sleeve 16 adjacent the opening 34 therethrough. An identical spring 50 is secured around the second pivot pin 46 in a fashion identical to the spring 50 which is secured around the pivot pin 44. Both of the springs 50 function for biasing a safety handle to a locking position in a manner and for a purpose hereinafter described.

The pivot pin 44 extends through the cam head 58 carried on one end of a safety handle 60. The handle 60 projects in a generally axial direction away from the pivot pin 44 when it is in the latching or locking position depicted in FIG. 3. The handle 60 extends outwardly and downwardly, as shown in the dashed line position in FIG. 1, at a time when the quick-disconnect coupling is to be disconnected. The pivot pin 44 also extends through a cam head portion 62 carried on one end of a locking cam lever handle 64.

In similar fashion, the pivot pin 46 projects through the cam head portion 66 of a safety handle 68 disposed on the opposite side of the coupling, and also through the cam head portion 72 of a locking cam lever handle 74 located on the same side of the coupling as the safety handle 68.

The modified embodiment of the invention is illustrated in FIGS. 5–8 of the drawings. In this embodiment, a dust cap 80 is utilized instead of the female coupler 12 depicted in FIGS. 1–4. The dust cap 80 is a generally cylindrical member and is provided for the purpose of closing off a tubular conduit which terminates in a male adapter 10 of the type hereinbefore described. The dust cap 80 includes a cylindrical body portion 81 and a closure plate 82 which lies in a plane extending normal to the axis of the cylindrical dust cap 80 and of the male adapter 10. In the case of the embodiment of the invention shown in FIGS. 5–8, the closure plate 82 has an apertured eye plate 84 formed at a central location thereon. The eye plate 84 functions for locking the dust cap in position by the use of the locking cam lever handles used in the modified embodiment of the invention and hereinafter described.

The dust cap 80 has formed through the cylindrical body portion 81 thereof at opposite sides of the dust cap, a pair of openings or apertures 86 and 88 of the type hereinbefore described. The openings 86 and 88 are aligned with the annular groove 30 formed in the male adapter 10 as hereinbefore described, which groove, as stated, has an outwardly facing concave surface. On opposite sides of the openings 84 and 86 through the cylindrical body portion 81 of the dust cap 80, pairs of arcuate protuberant lugs are formed and project radially outwardly from the cylindrical surface of the dust cap body portion. Thus, a pair of protuberant lugs 92 and 94 are formed on opposite sides of the opening 88, and a pair of lugs 96 and 98 are formed on opposite sides of the opening 86.

As previously described, a pair of pivot pins extend between the lug pairs for supporting locking cam lever handles and safety latch handles. Thus, a pivot pin 100 extends between the lugs 92 and 94, and pivotally supports a latching cam lever handle 102 and a safety latch handle 104. In similar fashion, a pivot pin 106 extends between the lugs 96 and 98 and pivotally supports a locking cam lever handle 108 and a safety latch handle 110. A spring 110 having several convolutions or turns wrapped about the pivot pin 106 is characterized as including a toe portion 112, as shown in FIG. 7, and an opposite end portion 114 as shown in FIG. 8. A similar spring element 116 has convolutions surrounding the pin 100 and has a toe portion 118 bearing against the side of the safety handle 104. A end portion 120 of the spring element 116 extends away from pivot pin 100 and bears against the outer surface of the cylindrical body portion 81 of the dust cap 80.

OPERATION

In the operation of the quick-disconnect coupling of the invention, the male adapter 10 is secured in any suitable fashion to an end of one of the two tubular conduit sections, which are to be interconnected through the coupling. The female coupler 12 is connected to the second of the conduit sections by any suitable means, such as by forcing the end of the tubular conduit section over the neck 24 of the female coupler so that the ribs 26 and 28 frictionally engage the inner surface of the tubular section.

The locking cam lever handles 64 and 74 of the safety handles 60 and 68 are, at this time, pivoted outwardly into the dashed line position shown in FIG. 1. When the handles 64 and 74 are pivoted to this position, the cam lobe which forms one side of the cam head portion 58 and 72 of the respective locking cam lever handle is pivoted outwardly, and does not bear against the concave, outwardly facing surface of the annular groove 30 formed around the male adapter 10. The male adapter 10 is then inserted into the sleeve 16 until the end face 18 thereof contacts the resilient sealing element 20 which is supported within the sleeve 16 and bears against the shoulder 22.

After the male adapter 10 has been inserted into the sleeve 16 to the described location, however, the locking cam lever handles 64 and 74 are pivoted to the full locking positions shown in full lines in FIGS. 1–4. In this position, the cam lobes forming the radially inner sides of the cam head portions 58 and 72 are caused to cam against the concave, outwardly facing surface of the annular groove 30, and the camming action which results forces the male adapter 10 further into the sleeve 16 until it compresses the resilient annular sealing element 20 and forms a tight seal thereagainst.

After the locking cam lever handles have been forced inwardly to the locking position, the safety cam handles 60 and 68 are then pivoted from the position represented by the dashed lines shown in FIG. 1 to the position depicted in full lines in FIG. 3. In this position, the cam lobe surface carried on the radially inner side of the cam head portion 58 and 66 of the handles 60 and 68 do not touch the concave outwardly facing surface of the annular groove 30. It will be noted, in fact, that there is spacial clearance between the inner cam surface of the cam heads of the safety cam handles 60 and 68, and the concave, outwardly facing surface in the deepest part of the annular groove 30. It will be further noted that the radially inner surfaces of the cam head are disposed radially inwardly from the outer peripheral surface of the male adapter 10. The importance of this spacial orientation will be subsequently explained.

When it is desired to release the coupling upon termination of high pressure fluid service through the coupling, the locking cam lever handles 64 and 74 are first manually pivoted outwardly from the locking position illustrated in full lines in FIGS. 1–4. As the handles 64 and 74 are pivoted outwardly, the cam lobes carried at the inner sides of the cam heads 62 and 72 thereof, move out of contact with the radially outwardly facing concave surface of the annular groove 30. The coupling therefore becomes unlocked in the sense that the end face 18 of the male coupling can move away from the resilient sealing element 20, and the fluid-tight seal preventing leakage of the high pressure fluid is relieved.

At this time, the high pressure of the fluid moving through the coupling would, but for the inclusion of the safety cam handles 60 and 68, literally blow the male adapter 10 away from the female coupling 12, endangering the personnel who have released the locking cam lever handles 64 and 74 from their locking positions. Such danger of forceable expulsion of the male adapter 10 from the female coupler 12 is alleviated, however, by the safety cam handles 60 and 68. At this time, the radially inner portions of the cam head portions of the safety cam handles 60 and 68 come in contact with the shallower portion of the annular groove 30, and prevent the male adapter 10 from being forced further in an axial direction away from the shoulder 22. In fact, movement of the male adapter 10 away from the female coupler 12 is stopped at the time when the radially inner cam surfaces of the cam heads of the two safety handles 60 and 68 contact the relatively shallow portion of the annular groove 30 which is at the axially opposite side of this groove from the shoulder 22. The springs 50 carried on the pivot pins 44 and 46 function during this phase of disconnection of the coupling to retain the safety handles 64 and 68 in their locked or safety positions which are shown in dashed lines in FIGS. 1 and 3. Thus, the outer end portions 56 of the spring 50 which bear against the outer side of the sleeve 16 act through the spring convolutions to force the toe portions 52 of each of the two springs firmly against the radially outer side of the safety handles 60 and 68 at locations displaced in an axial direction from the pivot pins 44 and 46, and toward the free ends of the safety handles 60 and 68.

In this status of the coupling, the high pressure fluid can bleed slowly through the small opening between the sealing element 20 and the end face 18 of the male adapter 10 so that the pressure of the high pressure fluid will be gradually reduced to a safe level. The safety handles 60 and 68 function, at this time, for two purposes. First, by allowing the high pressure fluid to bleed through the relatively small opening, a hissing noise will frequently be developed which will enable an unwary operator or workman to reclose the locking cam lever handles 64 and 74 very quickly to re-establish the fluid-tight seal until it is desired to relieve the high pressure fluid in the way described. The second, and most important, function of the safety handles 60 and 68 is to allow the high pressure to bleed down to a safe level without total disengagement of the coupling parts. After the pressure has been relieved, the safety handles 60 and 68 can be manually pivoted outwardly against the bias of the springs 50 to move a portion of the cam surface on the radially inner side of the cam heads 58 outwardly, and by this movement afford clearance between the cam heads on the safety handles and the surface of the annular groove 30. This will then allow the male adapter 10 to be completely released from the coupling, since there will be a clearance between the outer diameter of the male end portion 14 of the male adapter 10, and the closest part of the cam surfaces carried on the cam head portions of the safety cam handles 60 and 68.

The embodiment of the invention depicted in FIGS. 5–8 functions substantially identically to the quick-disconnect coupling embodiment shown in FIGS. 1 and 4. In the embodiment of FIGS. 5–8, a dust cap 80 has been used to seal off or close a conduit which may be carrying high pressure fluid. At this time, it may be desired, for reasons of security, to lock the dust cap 80 in place, and the angulated locking cam lever handles 102 and 108 can be locked by extending the hasp of a padlock or the like through the openings formed in the end portions of these locking handles, and the aperture formed through the apertured eye plate 84. The dust cap 80 is then removed from its secured closed position by removing the lock so that the locking cam lever handles 102 and 108 can be pivoted outwardly in the manner which has been previously described, and to the dashed line positions shown in FIG. 5. When this has been carried out without pivoting the safety cam handles downwardly to the position shown in FIG. 6, the bleed down of the high pressure fluid which has been described will occur, and will make it safe to completely remove the dust cap 80 after such pressure reduction. When the pressure within the dust cap and male adapter 10 has been relieved, then the safety cam handles 104 and 110 are pivoted downwardly to the position depicted in FIG. 6. In this position, it will be noted that clearance is afforded between the cam head portions of the safety handles 104 and 110, and the dust cap 80 can then be completely removed from its position of closure across the end of the male adapter 10.

From the foregoing description of the invention, it will be perceived that the present invention provides a highly useful quick-disconnect coupling which is safe to use because of the way the locking handles and safety handles cooperate during disconnection of the coupling. Although certain preferred embodiments of the invention have been herein described in order to afford an adequate illustration of its principles to permit the invention to be practiced by those skilled in the art, it will be understood that various changes and innovations in the invention can be effected without departure from such principles. All such changes and innnovations are therefore deemed to be circumscribed by the spirit and scope of the invention, except as the same may be necessarily limited by the appended claims, or reasonable equivalents thereof.

What is claimed is:

1. A quick-disconnect coupling for interconnecting a pair of tubular elements comprising:
   a tubular male adapter having an end face and further having an annular groove of arcuate, concave cross-sectional configuration extending around said male adapter at a location spaced axially along said male adapter from said end face, said groove defining an arcuate concave outwardly facing surface;
   a tubular female coupler including:
   a tubular neck portion;
   a tubular sleeve of larger diameter than said neck portion and having a pair of openings formed through the opposite sides thereof; and
   a radially extending annular shoulder extending between, and interconnecting, said sleeve and said neck portion, and forming an internal seal seat within said female coupler, said sleeve receiving said tubular male adapter therewithin, with said end face facing, and extending parallel to, said internal seal seat, and with said annular groove aligned with the openings through said sleeve;
   a first pivot pin secured to said tubular sleeve across one of the openings in said sleeve in a direction parallel to a diameter of said sleeve;
   a first, elongated locking handle pivotally mounted on said first pivot pin and including a first locking handle cam head having a cam surface thereon and having said first pivot pin extending through said first locking handle can head, said first locking handle cam head and cam surface being so configured and positionally arranged relative to said annular groove on said male adapter that pivotation of said first locking handle to a locking position in which said first locking handle extends substantially parallel to the axis of said tubular sleeve will cause said cam head to bias said male adapter axially inwardly into said sleeve until said end face is in a sealing position relative to said internal seal seat, whereas pivotation of said first locking handle to a de-coupling release position in which said locking handle is pivoted outwardly away from said sleeve and away from said locking position will cause said cam surface to move to a position away from the concave surface of said annular groove, and will allow said male adapter to move axially outwardly with respect to said sleeve, and will allow said end face to move away from said sealing position;
   a first elongated safety handle pivotally mounted on said first pivot pin and including a safety handle cam head having a radially inner surface thereon, and having said first pivot pin extending through said first safety handle cam head, said first safety handle cam head and the radially inner surface carried thereon being so configured and positionally arranged relative to said annular groove and its concave, outwardly facing surface that pivotation of said first elongated safety handle to a safe position in which said first elongated safety handle extends parallel to the axis of said tubular sleeve will place a part of said radially inner surface within said annular groove of said male adapter, and prevent said male adapter from moving totally out of said sleeve, whereas pivotation of said first elongated safety handle to a release position will move said radially inner surface radially outwardly out of said annular groove and allow said male adapter to be extricated from said sleeve when said locking handle is in said de-coupling release position;
   a first spring having convolutions around said first pivot pin and having a first part bearing against said first elongated safety handle and resiliently biasing said first safety handle to said safe position, and a second part bearing against said sleeve and resiliently resisting movement of said first safety handle away from said safe position, said first spring being positioned to continue to exert said resilient bias on said first safety handle to oppose movement of said first safety handle toward said release position from said safe position, with said resilient biasing of said first safety handle continuing throughout, and opposing, the entire movement of said safety handle from said safe position to said release position;
   a second pivot pin secured to said tubular sleeve across the other of said openings in said sleeve and located on the opposite side of said sleeve from said one opening, said second pivot pin extending in a direction parallel to a diameter of said sleeve and parallel to said first pivot pin;
   a second, elongated locking handle pivotally mounted on said second pivot pin and including a second locking handle cam head having a cam surface thereon, and having said second pivot pin extending through said second locking handle cam head, said second locking handle cam head and the cam surface carried thereon being so configured and positionally arranged relative to said annular groove, and its radially outwardly facing concave surface, that pivotation of said second locking handle to a locking position in which said second locking handle extends parallel to the axis of said tubular sleeve will cause the cam head carried on said second locking handle to bias said male adapter axially inwardly into said sleeve unit said end face is in a sealing position relative to said internal seal seat, whereas pivotation of said second locking handle to a release position in which said second locking handle is pivoted outwardly away from said sleeve and away from said locking position causes said cam surface on the cam head of said locking handle to move to a position away form the concave surface of said annular groove, and allows said male adapter to move axially outwardly with respect to said sleeve, and said e nd face to move away from said sealing position;
   a second elongated safety handle pivotally mounted on said second pivot pin and including a second safety handle cam head having a radially inner surface thereon, and having said second pivot pin extending through said second safety handle cam head, said second safety handle cam head and said radially inner surface carried thereon being so configured and positionally arranged relative to the outwardly facing concave surface of said annular groove that pivotation of said second elongated safety handle to a safe position in which said second safety handle extends parallel to the axis of said tubular sleeve will place a part of said radially inner surface carried on said second safety handle within said groove, sand prevent said male adapter from moving totally out of said sleeve in an axial direction, whereas pivotation of said first safety handle to a release position will move said radially inner surface carried on the cam head of said second safety handle radially outwardly out of said annular groove and allow said male adapter to be extricated from said sleeve by movement in an axial direction at a time when said first and second locking handles are pivoted to said release positions; and a second spring having convolutions around said second pivot pin and having a first part bearing against said second elongated safety handle and resiliently biasing said second safety handle to said safe position, and having a second part bearing against said sleeve and resiliently resisting movement of said second safety handle away from said safe position, said second spring being positioned to continue to exert said resilient bias against said second elongated safety handle to oppose movement of said second safety handle toward said release position from said safe position with said resilient biasing of said second safety handle continuing throughout, and opposing, the entire movement of said safety handle from said safe position to said release position.

2. A quick-disconnect coupling as defined in claim 1 and further characterized as including:

a first pair of lugs protruding from the outer periphery of said sleeve with the lugs in said first pair disposed on the opposite sides of said one opening through said sleeve, and having said first pivot pin extending across said one opening with its ends secured in said lugs; and a second pair of lugs projecting radially outwardly from the outer periphery of said sleeve with the lugs in said second pair located on opposite sides of said other opening, and said second pivot pin extending across said other opening and having its ends secured in said lugs of said second pair.

* * * * *